March 14, 1939.    G. HOLST ET AL    2,150,834
SOUND RECORD AND METHOD OF MAKING SAME
Filed Feb. 13, 1937
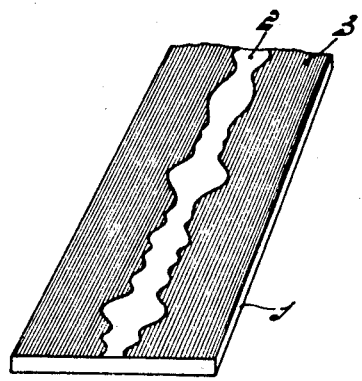
INVENTORS
GILLES HOLST
JAN HENDRIK DE BOER
BY
ATTORNEY.

Patented Mar. 14, 1939

2,150,834

UNITED STATES PATENT OFFICE 2,150,834

SOUND RECORD AND METHOD OF MAKING SAME

Gilles Holst and Jan Hendrik de Boer, Eindhoven, Netherlands, assignors to N. V. Philips' Gloeilampenfabrieken, Eindhoven, Netherlands Application February 13, 1937, Serial No. 125,653
In Germany February 17, 1936

6 Claims. (Cl. 274—46)

Our invention relates to optically-reproducible sound-records, particularly sound-films comprising a thin transparent support sensitized with a diazonium compound.

Although such films, with which the images are produced by forming an azo dyestuff, surpass the usual photographic films employing silver halogenides as light-sensitive material, in that they are "grainless", we have found that they are often unsatisfactory for sound reproduction, because the sound intensity is too low. More particularly, we have found that, although azo dyestuffs images produce sufficient contrast in the visible portion of the spectrum, they produce insufficient contrast in the infra-red portion, i. e. they insufficiently absorb light in the infra-red region.

Although it would be possible to select a definite combination of a diazonium compound and a coupling component to form an azo dyestuff having an absorption band in the infra-red region, such a procedure has several disadvantages. For example, either one of the coloring matter components at the non-colored parts of the support would absorb also infra-red light, or the light-decomposition product of the diazonium compound—which product is also present on the portions of the films uncolored for the visible light—would absorb considerable infra-red light, thereby resulting in insufficient contrast.

The above difficulties are very pronounced in the reproduction because the photo-electric cells usually employed are very sensitive in the infra-red region of the spectrum, and because the light sources used have an intensive radiation in this region.

The object of our invention is to overcome the above-mentioned difficulties of optically-reproducible sound records sensitized with diazonium compounds.

In accordance with the invention we produce a metal image, instead of converting the diazonium compound into an azo dyestuff. More particularly, we bring a metal salt into reactive relationship with the light-decomposition product of the diazonium compound in a manner known per se to form a metal image.

In order that the invention may be clearly understood and readily carried into effect, we shall describe same more fully with reference to the accompanying drawing in which the single figure is a sectionized perspective view of a sound film according to the invention.

The positive sound film shown by way of example in the drawing comprises a thin support 1 of transparent material, for instance regenerated cellulose having a thickness of less than 0.06 mm., and carrying a sound track 2 bounded by an opaque or image portion 3.

In accordance with the invention a diazonium compound is originally provided on support 1 and the image portion 3 is formed by bringing a metal salt in reactive relationship with the light-decomposition product of the diazonium compound. The metal salt, similarly to the diazonium compound, may be incorporated in support 1 prior to the recording operation, or the metal salt may be applied after the exposure. The metal salts may be for example, silver salts or mercurous salts.

The absorption of the metal image 3 for light in the visible part of the spectrum is of the same order of magnitude as that of an azo dyestuff image, whereas the absorption of the metal image for light in the infra-red portion of the spectrum is very much higher than that of the azo dyestuff image. Thus it is of great advantage to use the metal images according to the invention in grainless transparent film for sound recording.

Particularly sharp contrasts can be obtained by using a mercurous salt. When using a mercurous salt, we prefer to use together therewith a salt of a metal which lies above mercury in the electro-chemical series, for example silver, gold and platinum, whereby images produced are much more stable than those produced solely by a mercurous salt and a diazonium compound. The production of such metal images has been set forth in detail in U. S. Patent 2,067,690 filed Jan. 11, 1935 to Alink et al.

As has been stated, films having a metal image according to the present invention are particularly suitable for reproduction with photo-electric cells, for instance cells having a caesium-caesium oxide cathode, as such cells are very sensitive in the infra-red region, and the light sources used in conjunction with such cells have an intensive radiation of light in the infra-red region. In addition to having advantages in direct reproduction, the films of the invention are also of advantage in making copies.

The sound record itself is being claimed in our copending U. S. patent application S. N. 249,302 filed January 4, 1939.

While we have described our invention in connection with specific examples and applications, we do not wish to be limited thereto but wish the appended claims to be construed as broadly as permissible in view of the prior art.

What we claim is:—

1. A method of photochemically forming an optically-reproducible sound record on a thin transparent support, comprising the steps, sensitizing the support with a diazonium compound, selectively exposing the sensitized support in accordance with the sound to be recorded to decompose the diazonium compound at selected portions of the layer, and forming a metal image of said selected portions with a metal salt.

2. A method of photochemically forming an optically-reproducible sound record on a transparent support of regenerated cellulose having a thickness less than 0.06 mm., comprising the steps, sensitizing the support with a diazonium compound, selectively exposing the sensitized support in accordance with the sound to be recorded to decompose the diazonium compound at selected portions, and forming a metal image of said selected portions with a metal salt.

3. A method of photochemically forming an optically-reproducible sound record on a thin transparent support, comprising the steps, sensitizing the support with a diazonium compound, selectively exposing the sensitized support in accordance with the sound to be recorded to decompose the diazonium compound at selected portions, and forming a metal image of said selected portions with a mercurous salt.

4. A method of optically reproducing sound, comprising the steps, sensitizing a thin transparent support with a diazonium compound, selectively exposing the sensitized support in accordance with the sound to be recorded to decompose the diazonium compound at selected portions, forming a metal image of said selected portions with a metal salt, and reproducing the so-formed sound record with a photo-electric cell sensitive in the infra-red region of the spectrum.

5. A method of photochemically forming an optically-reproducible sound record on a thin transparent support, comprising the steps, sensitizing the support with a diazonium compound to form a light-sensitive layer, selectively exposing the sensitized support in accordance with the sound to be reproduced to decompose the diazonium compound at selective portions of the layer, and applying a metal salt to the exposed layer to form metal images at the exposed portions by the reaction between the metal salt and the light-decomposition product of the diazonium compound.

6. A method of photochemically forming an optically reproducible sound record on a thin transparent support, comprising the steps, incorporating within a surface portion of the transparent support to form a light-sensitive layer a diazonium compound and a metal salt adapted to react with the light-decomposition product of the diazonium compound to form a metal image, selectively exposing the layer in accordance with the sound to be recorded to decompose the diazonium compound at selected portions of the layer, and forming metal images by the reaction between the metal salt and the light-decomposition product of the diazonium compound.

GILLES HOLST.
JAN HENDRIK DE BOER.